United States Patent [19]

Lodge

[11] 4,175,654

[45] Nov. 27, 1979

[54] VIBRATORY FEEDER SYSTEM AND MECHANISM

[75] Inventor: Maurice H. Lodge, Palatine, Ill.

[73] Assignee: Motorola, Inc., Schaumburg, Ill.

[21] Appl. No.: 844,342

[22] Filed: Oct. 21, 1977

[51] Int. Cl.$^2$ ............................................. B65G 47/24
[52] U.S. Cl. ................................... 198/398; 198/416; 198/609; 221/160
[58] Field of Search ............... 198/398, 383, 771, 416, 198/399, 400, 609; 221/157, 158, 159, 160, 161, 162, 172

[56] References Cited

U.S. PATENT DOCUMENTS

| 3,103,283 | 9/1963 | Preuss | 221/160 X |
| 3,224,553 | 12/1965 | Campbell | 198/398 X |

Primary Examiner—Robert B. Reeves
Assistant Examiner—Douglas D. Watts
Attorney, Agent, or Firm—James W. Gillman; Victor Myer

[57] ABSTRACT

A vibratory feeder device has a forward moving mechanism and recirculating, or return, mechanism side by side and separately and independently controllable. The forward feeding mechanism has a feeder track that includes an angularly sloping surface down which devices to be fed, such as transistor chips, slide under the influence of gravity into the return chute unless caught by the terminals of the fed devices. The angularly sloping surface has a groove in the feed direction in which the terminals become engaged. If the device's terminals are engaged by the groove so that they are in the proper attitude, the devices are fed along under the vibratory feed forces. If not, they are brushed off onto the angularly sloping surface by a blade or fall through a hole adjacent a deflector. In either case the rejected devices are returned to the supply hopper. Devices that are properly oriented are moved with their terminals out of the groove and onto the ledge of a lower rail that guides them into a feed pathway formed with a second or upper rail. Adjacent the entry to the feed pathway there is a further hole through which rectangular devices, oriented vertically rather than horizontally, fall. The further hole also enables the row, or file, of properly oriented devices to buckle and spill into the return chute when the oriented devices at the end of the feed pathway are not being moved away fast enough.

6 Claims, 9 Drawing Figures

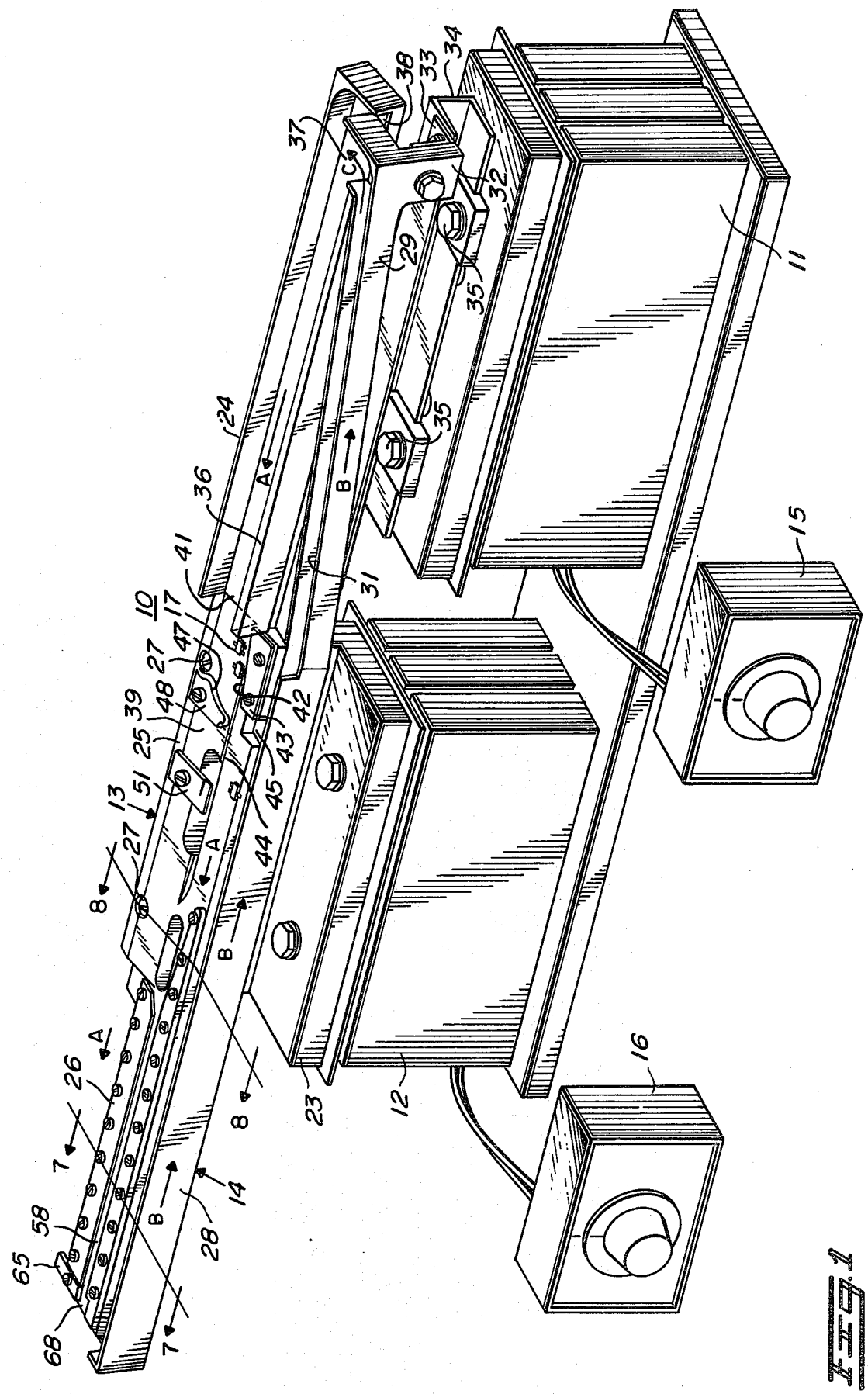

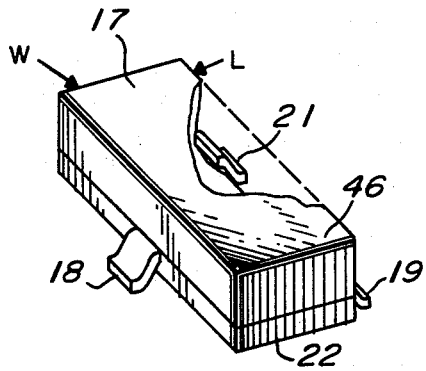
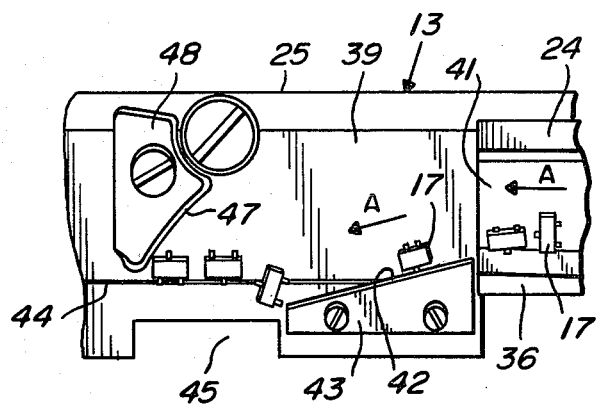
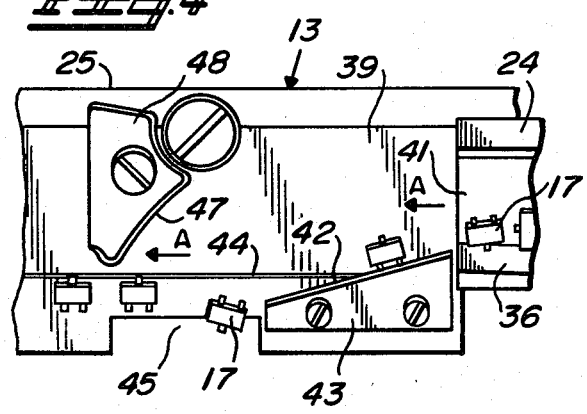
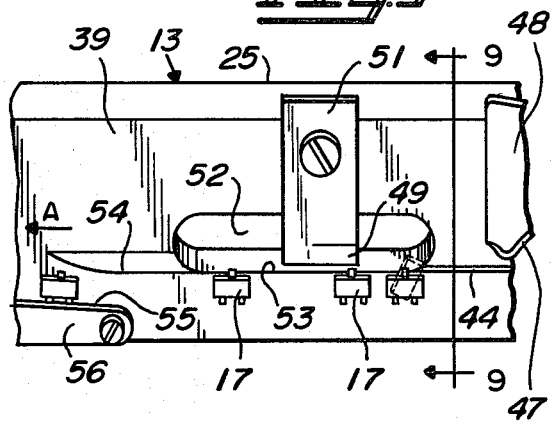
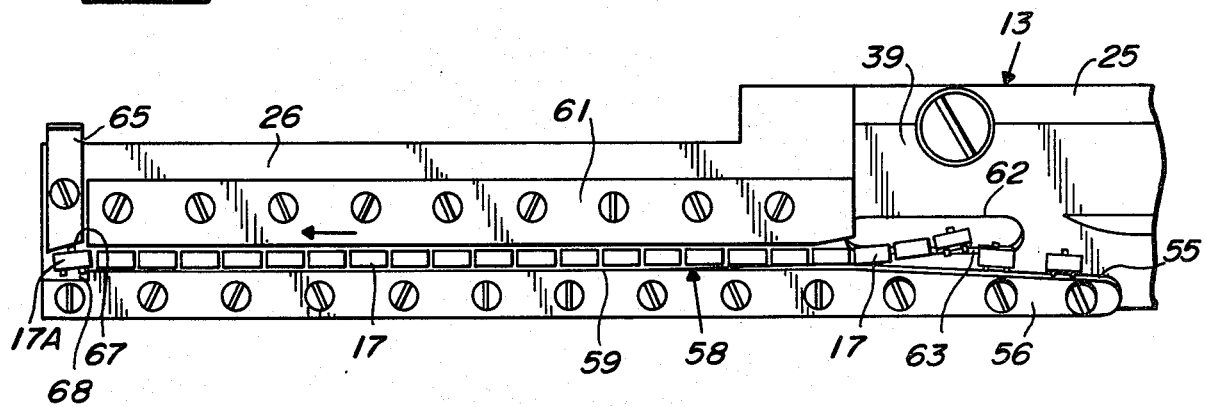

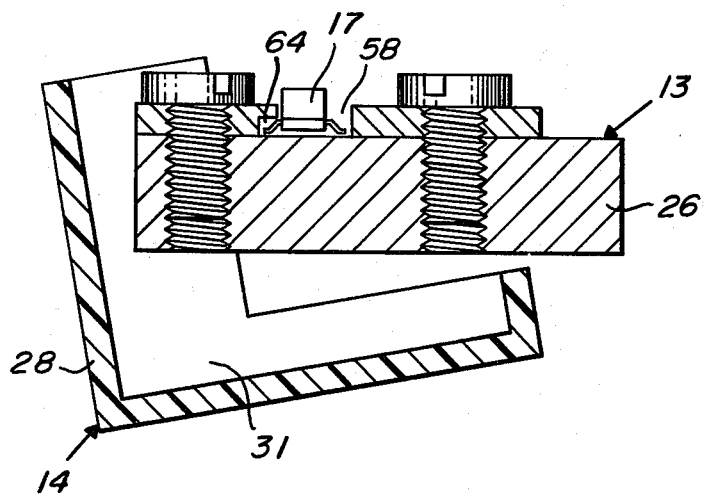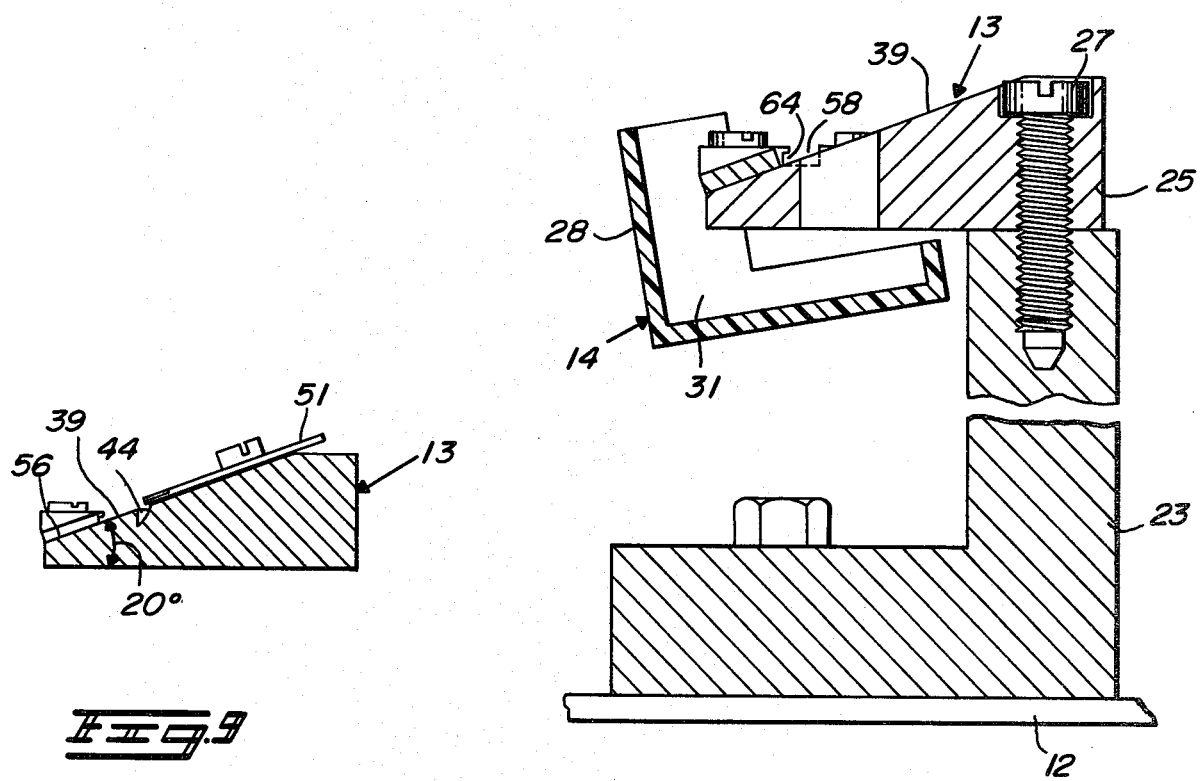

VIBRATORY FEEDER SYSTEM AND MECHANISM

BACKGROUND OF THE INVENTION

This invention relates to vibratory feeders for feeding small parts such, for example, as chip capacitors, transistor chips, or the like, in which the parts are oriented into a particular position and fed outwardly to a utilization device and any parts which are not properly oriented during the process, but remain misoriented, are rejected by the feeder and recirculated to the beginning for passing through the feeder and orienting process again. This process goes on continuously and as the parts are used at the output of the feeder, as by a pick and place machine, additional parts are added to the supply hopper, or inventory mechanism, so that the orienting and feeding can go on continually.

Recirculating feeders of the type described utilize some assymmetry or anomaly in the shape of the device to be fed, such for example as rectangular as compared with square, to orient the devices into the proper attitude, rejecting those which do not conform to this attitude before the end of the feeder is reached, and feeding out the devices which are properly oriented.

Prior devices of this nature have been bulky and subject to jam ups because the orienting mechanisms did not function satisfactorily, would not orient a sufficient percentage of the devices in a single pass through the mechanism, thereby requiring excessive amounts of recirculation, and would also reject too high a percentage of devices which were properly oriented. Orienting and feeding semiconductive devices which are small parts, being of the order of small fractions of an inch on a side, require feeders of small size to be satisfactory. It is further required that the devices be accurately oriented so that automatic equipment may be used to pick them up and place them into another location without additional manual effort. Typical of prior devices for feeding and orienting articles is the U.S. Pat. No. 2,939,567 Mazura et al. In this patent, a part of a fastener, ordinarily referred to as a zipper, is oriented merely by vibrating the part against a rail along a relatively long surface. Such apparatus would have difficulty functioning with devices that are only slightly rectangular as compared with square because of insufficient mechanism for rejecting devices not properly oriented, and would not function with transistor chips, for example, which have terminals extending from two sides and lying below a major surface of the transistor chip.

SUMMARY OF THE INVENTION

Accordingly it is an object of the invention to provide an improved vibratory feeder system and mechanism that will eliminate the defects of the prior art, will feed small rectangular devices in an accurate and efficient manner and will be small in size and inexpensive in construction.

It is a further object of the invention to provide an improved vibratory type feeder system and mechanism of the nature indicated that is of the recirculating type in that parts which are misoriented and have been rejected by the mechanism are recirculated to the input thereof and passed through the orienting process again.

It is a further object of the invention to provide an improved vibratory system and mechanism of the character indicated wherein the feeding in the reverse or recirculatory direction may be independently controlled relative to the forward feeding or orienting direction.

In carrying out the invention according to one form there is provided an improved vibratory feeder system for orienting and feeding devices comprising a vibratory feeder track for advancing oriented devices thereon, inventory means connected to the feeder track and vibrated thereby, means on the feeder track for orienting devices fed there along and for rejecting misoriented devices to a vibratory return mechanism for receiving rejected devices and returning same to the inventory means, separately controllable vibratory means for operating the vibratory feeder track and further separately controllable vibratory means for operating the return mechanism.

In carrying out the invention according to another form there is provided a vibratory feeder system for orienting and feeding devices which have two parallel sides out of one side of which there projects one centrally disposed terminal and out of the other side of which project two symmetrically disposed terminals, the ends of each of the terminals extending away from the adjacent major surface of the device comprising a vibratory feeder track for advancing oriented devices thereon, inventory means connected to said feeder track and vibrated thereby, groove means on said track in line with the feed direction for being engaged by said terminals, the feeder track having an angularly downwardly disposed feeder surface for gravity assist in device orientation and rejection of upside down and other misoriented devices, lead-in means disposed on the angular surface and having an angular edge sloping downwardly in the direction of device travel for enabling the preponderance of devices that are engaged by the groove, to be engaged by the one terminal, rejecting means having an edge disposed adjacent the groove for rejecting devices whose terminals are in the grooves and the devices are upwardly disposed, slot means beyond the rejecting means and whose lower edge is adjacent the groove for receiving and recycling rejectable devices not rejected by the rejecting means, lead-out means terminating the groove for disposing devices on the angle surface, first rail means having a ledge for retaining devices on the angle surface following the lead-out means and second rail means disposed away from the ledge of the first rail means to form a path for receiving oriented devices.

BRIEF DESCRIPTION OF THE DRAWINGS

FIG. 1 is a perspective view of a vibratory feeder according to the invention;

FIG. 2 is a perspective view of one form of device or element that will be oriented and fed in the apparatus of FIG. 1;

FIGS. 3, 4, 5 and 6 are fragmentary plan views of various portions of the apparatus illustrating its functioning at various stages;

FIG. 7 is a sectional view on an enlarged scale taken substantially in the direction of the arrows 7—7 of FIG. 1;

FIG. 8 is a sectional view on an enlarged scale taken substantially in the direction of the arrows 8—8 of FIG. 1, and FIG. 9 is a sectional view taken substantially in the direction of the arrows 9—9 of FIG. 5.

DESCRIPTION OF THE PREFERRED EMBODIMENT

Referring to the drawings there is shown a vibratory feeder 10 according to the invention that includes an advancing vibratory mechanism 11, a return or recycling vibratory mechanism 12, a feeder track 13 operated by vibrating mechanism 12 and a return chute 14 operating by vibratory mechanism 11. The vibratory mechanisms 11 and 12 may be electrically operated, of any well-known form, and may be independently controlled such as by individual controls 15 and 16 respectively. The independent feeding control enables devices to be fed faster or returned faster as may be needed, or desired. The functioning of the vibratory members 11 and 12 to vibrate the feeder track 13 and the return or recycling chute 14 is well understood in this art and is not believed to require further elaboration in this specification. Small parts 17 such as a rectangularly shaped transistor chip, for example, are fed in the direction of arrows A and devices which are misoriented and recycled are returned to the input of the feeding mechanism in the direction of arrows B.

While one of the devices or elements intended to be oriented and fed by the feeder according to the invention comprises a transistor chip 17 which is a small part, rectangular in cross section, of which the dimension L may be of the order of $\frac{1}{8}$ of an inch and the width dimension W may be or the order of one-half L, it will be understood that this is exemplary only. The devices to be fed may be larger or smaller as the case may require. Likewise the relative dimensions of L and W may be closer to each other, although in the preferred form, L is larger than W in order that this aspect may be utilized to orient the devices into the desired attitude. Also in the particular case, the transistor chip 17 has three terminals 18, 19 and 21 of which the terminal 18 is centrally disposed along on one side and the terminals 19 and 21 are symmetrically disposed on the opposite side. In each case, the terminals 18, 19 and 21 terminate slightly below the major surface 22 of the transistor 17.

The feeder track 13 is mounted by means of an L-shaped bracket 23, for example, onto the vibrating mechanism 12 as may be seen more clearly in FIG. 8. Attached to feeder track 13, so as to vibrate therewith in the feed direction A, is a hopper 24, or inventory element, into which the devices 17 to be fed are placed in the first instance by any well-known means and which also receives the recycled parts. The feeder track 13 which also includes a central orienting part 25 and a feeding or alignment part 26 is attached to the vibrating mechanism 12 by any well-known means such for example as bolts 27.

The return, or recycle, chute 14 includes a horizontal portion 28 and an angularly rising part 29, the horizontal portion 28 extending along side the feeder track portions 25 and 26 and the angularly rising portion 29 extending along side the hopper 24 for purposes to be described. The horizontal part 28 is angle-shaped so as to form a receptacle for any parts 17 falling off the end of the feeder track 26 or from any portion of the feeder track 25 so that these parts will be returned in the direction of arrows B to the angularly rising part 29. The part 29 of the return chute is essentially U-shaped in cross section, again to form a receptacle 31 (FIGS. 7 and 8) for feeding the recycled parts to the hopper, or inventory means, 24 as shown by the arrow C.

The return chute 14 is supported on the vibrating member 11 as by means of a finger 32 attached by an L bracket 33 and thus to a channel member 34 which in turn is bolted to the mechanism 11 by bolts 35. The vibrating mechanism through the attaching structure just described vibrates the return chute 14 in such a manner as to feed parts therein in the direction of arrows B and C, while the vibrating member 12 operates to feed parts in the hopper 24 and on the feeder track 13 in the direction of the arrows A.

The hopper 24, or inventory element, is essentially a U-shaped channel member for containing the parts to be fed therealong, preferably against the wall 36, the hopper being disposed at an angle for a purpose to be described. The upper end of the portion 29 of the return chute 14 includes an opening 37 which is disposed over a slot 38 in the wall 36 of the hopper so that devices 17 fed upwardly in the return chute pass through opening 37 and fall into the hopper 24.

The central portion 25 of the feeder track 13 includes an angle surface 39 which may be approximately 20° with the horizontal whereas the end portion 26 is preferably horizontal.

The remaining structure of the feeder track 13 may be described in connection with a description of the operation of the device when devices such as transistor chips 17 are fed by the mechanism. Thus, it may be assumed, as seen more particularly in FIGS. 3–6 inclusive, that there are devices in the hopper 24 that are being advanced in the direction of arrows A by vibrating mechanism 12. Devices in the return chute 14 are being returned or recycled in the direction of arrows B by the vibrating mechanism 11. As the devices 17 are moved out of the mouth 41 of the hopper 24, they move on to the angle surface 39 of the feeder track. The angle surface 39 is at the same angle as the floor of the hopper and by virtue of the angularity of the surfaces the force of gravity causes the devices 17 to hug the wall 36 and to move downwardly on the angle surface 39. As the devices 17 continue downwardly, they come against the angular edge 42 of lead-out member 43 disposed immediately adjacent the mouth 41. Between the extremities of the angular edge 42 there is a groove 44 in the angular surface 39 disposed in the direction of travel of the devices and having a cross section in general as shown in FIG. 9.

About at the end of lead out member 43 there is a slot 45 cut through the angular surface 39 and disposed over the receiving portion 31 of the portion 28 of the return chute. Devices 17 that are disposed on their backs, for example as on the surface 46 (FIG. 2), will slide downwardly on the angle surface 39 under the influence of gravity and the vibratory force tending to move the devices in the direction of arrows A and will fall off of the angle surface 39 through the slot 45 into the return chute, or receptacle 31. This may be visualized by the device 17 in FIG. 4 about to fall through slot 45.

Device 17 which upon moving onto angle surface 39 with the major surface 22 downwardly can have the terminals 18, 19 and 21 engage in the groove 44 as may be visualized in FIGS. 3, 4 and 5. If the single terminal 18 of one device or both terminals 19 and 21 of another device are engaged in the groove 44 and the devices remain disposed upwardly as seen in FIG. 3, they come up against the leading edge 47 of a blade member 48. The lower end of the edge 47 extends relatively close to the groove 44 so that a slight chamfer on the edge 47 lifts up, so to speak, the devices 17 in this attitude and they are brushed off onto the remaining portion of the angle surface 39. Thus, the devices also fall through slot 45 and into the receptacle 31 of the return chute 14.

If the devices 17 coming down the angular edge 42 have their single terminals 18 engaged in the groove 44 with the devices oriented downwardly as may be seen in FIG. 4, the lower most end of edge 47 avoids these devices and they move along the groove 44 under the vibratory force being exerted thereon held by their single terminals 18. The fact that the single terminal 18 is centrally disposed between the ends of the devices 17 causes them to, in effect, hang from the groove and remain in this desired attitude.

In the process of feeding devices out of the mouth 41 and onto the angle surface 39 and further moving downwardly on the angular edge 42, by far the greater percentage of the devices that move onto the slot 44 and have their terminals engaged thereby have only the single terminal 18 engaged thereby rather than both terminals 19 and 21. Experience has shown this to be the case, and it is believed to occur by virtue of the fact that when either of the terminals 19 and 21 engage the groove 44 the assymmetry of the device relative to the terminal causes it to pivot in such a way that it falls over the groove 44 and through the slot 45 into the return chute. If more than one device is piled upon another and the lower most has its terminals engaged in the groove 44, the edge 47 of the blade 48 will brush such devices off and they will then fall through the slot 45.

Devices which are canted, for example, as may be seen dotted in FIG. 5, come opposite the thin ended and angled lower edge 49 of a deflector 51 which tends to straighten these devices out so that they will hang by the single terminal or they will be brushed off the angle surface 39. They will fall through the slot 52 formed in the angle surface 39 of the feeder track and thus into the return chute. They may also slide down the surface 39. The lower edge 53 of the slot 52 blends into the groove 44 so that properly oriented devices at this stage tend to remain so and are not deflected by the proximity of the deflector 51 and its lower edge 49.

As the devices 17 move beyond the slot 52 they move on to a lead-out portion 54 of the groove 44 which lead-out portion has an upwardly rising angularity inasmuch as the groove terminates as may be seen in FIG. 5. Thus the engagement of the single terminal 18 with the groove 44 is released and the device 17 slides down the angle surface 39 and the two terminals 19 and 21, now lower most, fall against the edge 55 of a lower rail 56, the lower rail being attached to the feeder track by screws 57 as shown. The vibratory moving force continues and moves the devices 17 along the initial surface 55 of the rail 56 and into the groove 58 formed between the upper edge of lower rail 56 and the lower edge 59 of upper rail 61.

When the devices move into the slot or goove, or path, 58, they are in proper alignment for being picked up at the left hand edge, as shown in FIG. 6 by some utilization device, not shown, that may be referred to as a pick and place machine or apparatus.

At the end of the angle surface 39 there is a further slot or hole 62 through which misoriented devices may fall. For example, if, by some chance at this stage of the operation, the devices 17 are oriented vertically rather than horizontally, that is to say, the devices are standing on their ends rather than on their sides they will fall through the hole 62 into the return chute. This occurs because the lower edge 63 of the hole 62 is disposed essentially half way between the ends of the devices 17 lying horizontally, i.e., one-half W. Thus any device standing on its end will be heavier at the upper end and will fall through hole 62. In the instance where slightly rectangular devices are to be fed, such for example as chip capacitors, where there are no terminals to be engaged by grooves, the hole 62 may be disposed toward the right hand end of the angular surface 39 in order that the rectangularity of the devices may be used to orient them as compared with the terminals.

If the groove or path 58 is full and the end device 17A is not being used, such as for example when the pick and place machine is not functioning, the devices in the groove are being held stationary, and the vibratory feed force in the direction A continues, the column or row of devices 17 may buckle at the hole or slot 62 and the devices fall there through and into the return chute. Accordingly no continued advancing force will be exerted on the devices in the groove 58 beyond that necessary to maintain them properly in this attitude.

In order that the devices 17 in the groove 58 may be more precisely oriented, the lower rail 56 is undercut slightly to provide a groove 64 for receiving the terminals 19 and 21 of the devices and permitting the lower edge of the device to lie against the rail edge. At the output of the end portion 26 of the feeder track, there may be a locating member 65 held, as by a screw 66, the lower edge of the holding member being provided with an angular surface 67 which will urge the device 17 at the end of the groove 58 into a slot 68 for more accurate positioning of the device 17A. In this way the device at the very end is very accurately located for pick-up by whatever utilization device is used.

While a particular embodiment of the invention has been shown, it will be clear that there are other embodiments within the scope of the invention.

I claim:

1. A vibratory feeder system for orienting and feeding devices which have two parallel sides out of one side of which there projects one centrally disposed terminal and out of the other side of which there project two symmetrically disposed terminals, the ends of each of said terminals extending away from the adjacent major surface of said device comprising, a vibratory feeder track for advancing oriented devices thereon, inventory means connected to said feeder track, groove means on said track in line with said feed direction for being engaged by said terminals, said feeder track having an angularly downwardly disposed feeder surface for gravity assist in device orientation and rejection of upside down and other misoriented devices, lead-in means disposed on said angular surface and having an angular edge sloping downwardly in the direction of device travel for enabling the preponderance of devices which are engaged by said groove, to be engaged by said one terminal, rejecting means having an edge disposed adjacent said groove for rejecting devices whose terminals are in said groove and the devices are upwardly disposed, slot means beyond said rejecting means and whose lower edge is adjacent said groove for receiving and recycling devices not rejected by said rejecting means, lead-out means terminating said groove for disposing devices on said angle surface, first rail means having a ledge for retaining devices on said angle surface following said lead out means, and second rail means disposed away from the ledge of said first rail means to form a path for receiving oriented devices.

2. A vibratory feeder system according to claim 1 including deflector means disposed over said slot means for further orienting said devices into a single line.

3. A vibratory feeder system according to claim 1 including further slot means disposed beyond said lead-out means and having an edge disposed away from the ledge of said first rail means by a predetermined distance, said distance being essentially equal to one-half of the short dimension of a rectangle defining the outline of a device to be fed.

4. A vibratory feeder system according to claim 1 including locating means disposed at the end of said path.

5. A vibratory feeder system according to claim 1 wherein said first rail means includes a recessed portion for receiving the terminals of said devices being fed.

6. A vibratory feeder system according to claim 1 including means for breaking a column of oriented devices prior to entry into said path when said path is full and the devices are not being removed.

* * * * *